Dec. 27, 1955  A. B. ELKINS  2,728,537
AIRCRAFT WITH SHROUDED PROPELLING AND LIFTING ROTORS
Filed Jan. 6, 1953  3 Sheets-Sheet 1

INVENTOR.
ARTHUR B. ELKINS

Dec. 27, 1955 — A. B. ELKINS — 2,728,537
AIRCRAFT WITH SHROUDED PROPELLING AND LIFTING ROTORS
Filed Jan. 6, 1953 — 3 Sheets-Sheet 2

*INVENTOR.*
ARTHUR B. ELKINS

Dec. 27, 1955 — A. B. ELKINS — 2,728,537
AIRCRAFT WITH SHROUDED PROPELLING AND LIFTING ROTORS
Filed Jan. 6, 1953 — 3 Sheets-Sheet 3
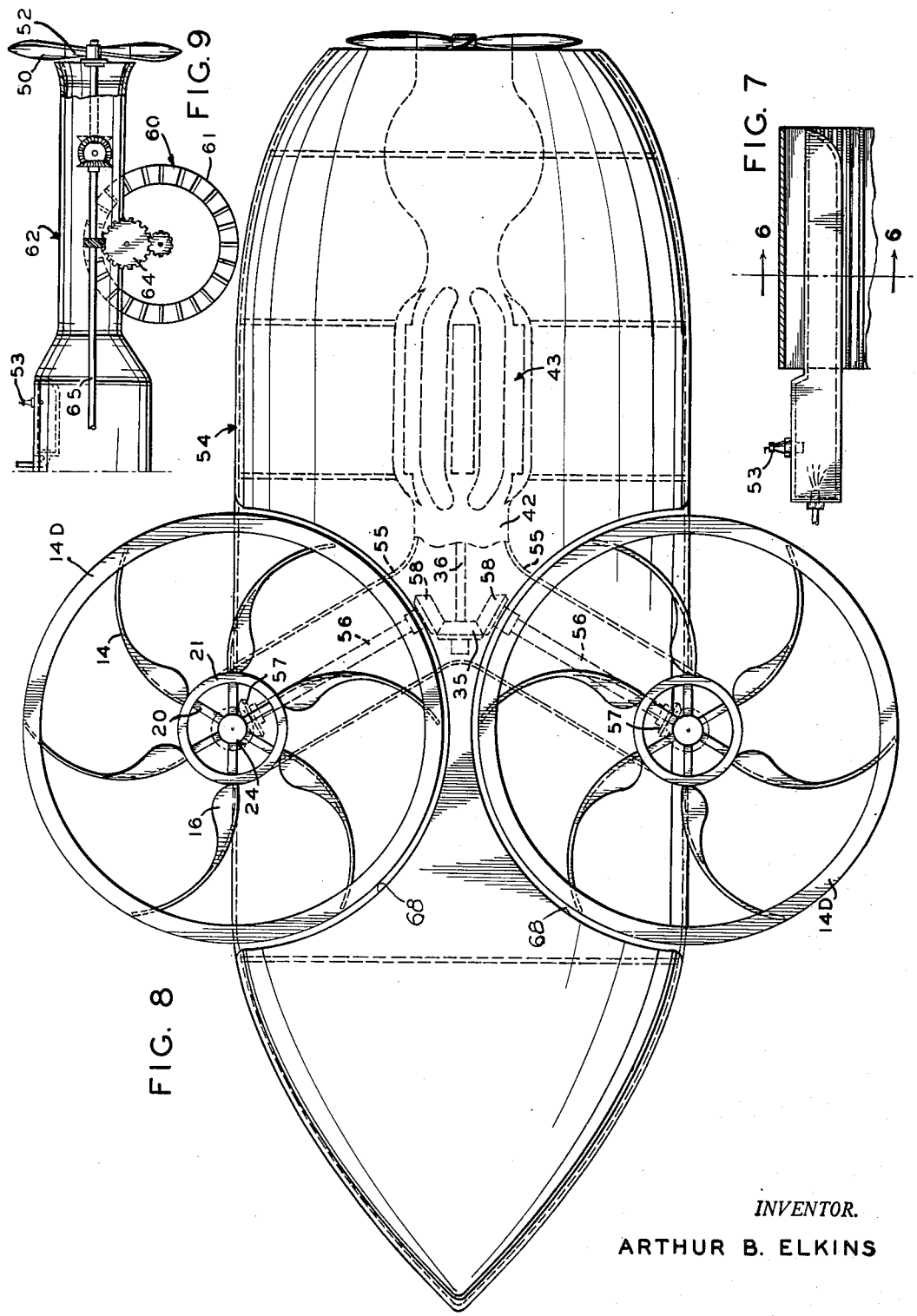
INVENTOR.
ARTHUR B. ELKINS

United States Patent Office 2,728,537
Patented Dec. 27, 1955

2,728,537

AIRCRAFT WITH SHROUDED PROPELLING AND LIFTING ROTORS

Arthur B. Elkins, Washington, D. C.

Application January 6, 1953, Serial No. 329,840

2 Claims. (Cl. 244—23)

This invention relates to aircraft and more particularly to vertical lift type aircraft having rotary mechanism for providing the lifting effect.

Heretofore aircraft of various and sundry types have been produced, but such craft lack the ability to take off and land in limited areas or else are cumbersome, slow-moving, have exposed rotors and are possessed of other characteristics which render them in need of improvement, or dangerous.

It is an object of the invention to produce aircraft of improved character, which can readily take off and land in limited areas, which is compact, highly maneuverable, capable of attaining high speeds and high altitudes, having a substantially fully enclosed cabin area, capable of lifting heavy pay loads, and of being operated on low-grade fuel.

Figure 1:
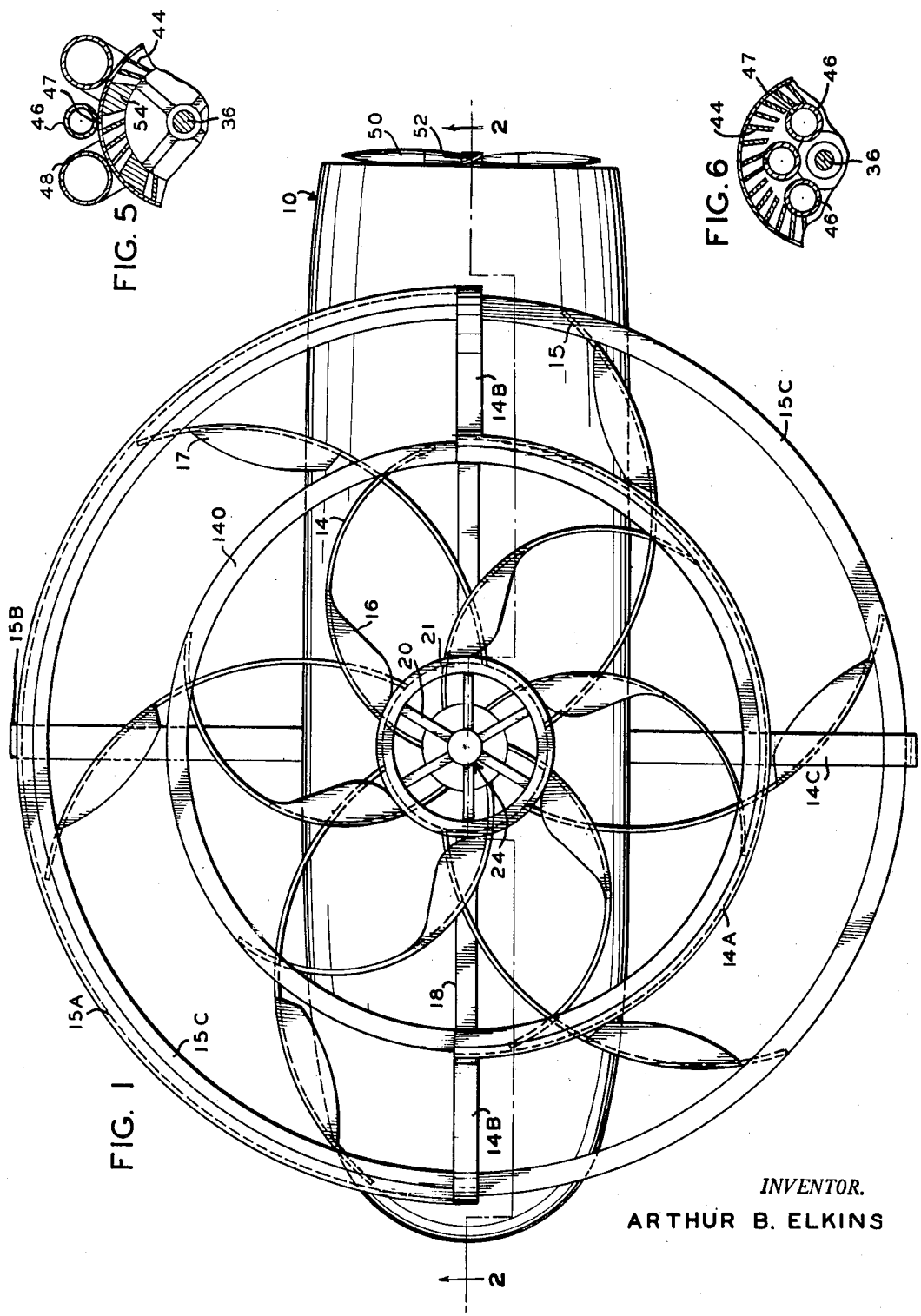
Figure 2:
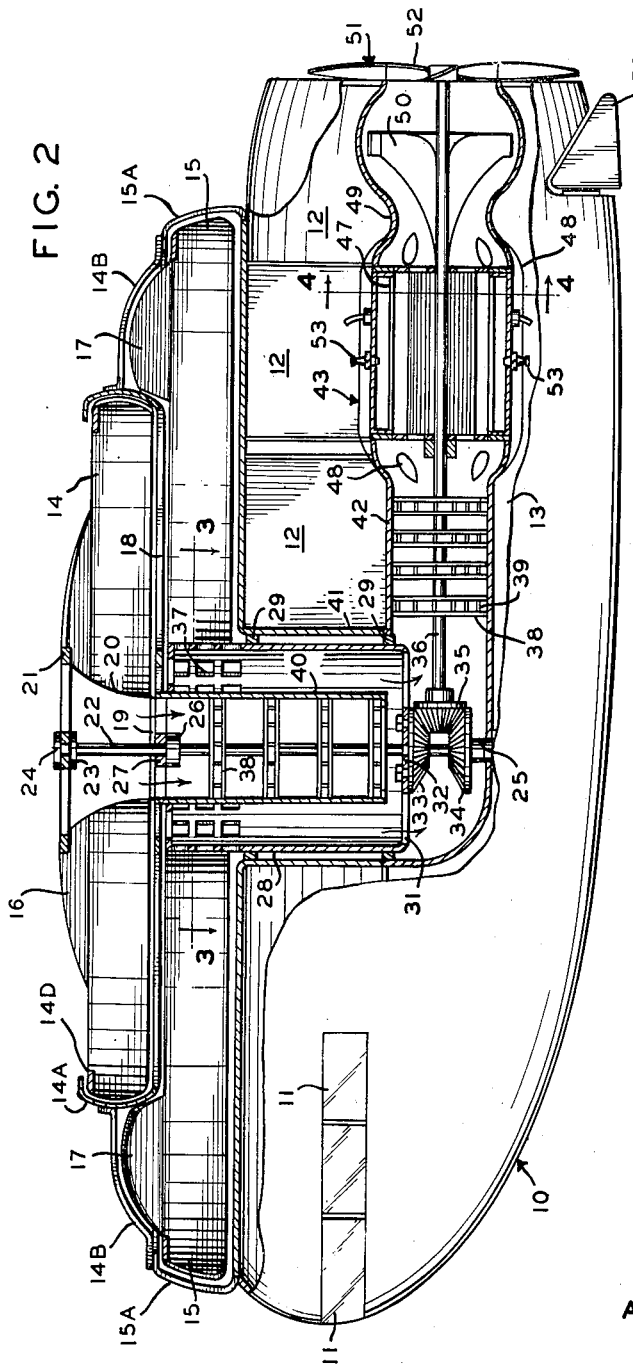
Figure 4:
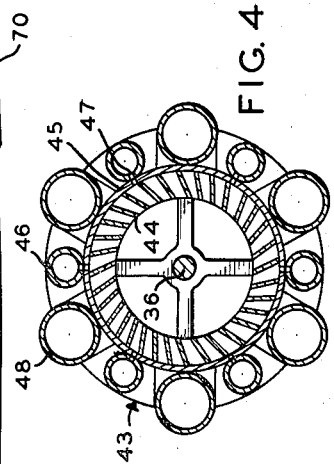
Figure 3:
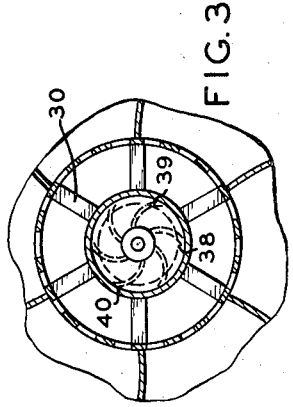

Further objects and advantages of the invention will be apparent from the following description taken in conjunction with the accompanying drawings, wherein:

Fig. 1 is a top plan view illustrating one application of the invention;

Fig. 2, a side elevation with parts broken away along its longitudinal axis for greater clarity;

Fig. 3, a section on the line 3—3 of Fig. 2;

Fig. 4, a section on the line 4—4 of Fig. 2;

Fig. 5, a fragmentary detail section of a slightly modified construction;

Fig. 6, a fragmentary detail section of a further modified structure taken on the line 6—6 of Fig. 7;

Fig. 7, an enlarged fragmentary section illustrating a portion of a modified form of combustion chamber;

Fig. 8, a top plan view of a modified form of aircraft; and

Fig. 9, a detail of a modified form of drum turbine.

Briefly stated, the invention comprises a relatively compact arrangement of parts including a fuselage with saucer-type rotary lifting vanes of relatively small diameter in comparison with the lifting areas of the conventional type of aircraft. The rotary lifting vanes force air downwardly through a compression duct in which are contained a multiple series of blade-type compression members, and from this compression duct the compressed air passes in or onto a drum turbo-jet engine from which the exhaust gases are discharged through the stern of the aircraft.

The drum turbo-jet engine drives a propeller shaft having on its rear end a conventoinal push-type propeller. This propeller shaft is also geared to drive the compressors as well as the rotary lifting vanes.

This drum turbo-jet engine includes combustion chambers elongated axially of the drive shaft and they are located either interiorly or exteriorly of the drum turbine blades. The ignited fuel charge or blast from the combustion chambers pass through slots the length of the turbine and engage the full length and width of the surface of the blades of the turbine to impart driving force thereto.

Instead of superimposed saucer-like lifting rotors as shown in Figs. 1 and 2, two or more rotors of saucer-like character may be disposed side by side in substantially the same plane as illustrated in Fig. 8. Unlike the conventional type vertical lift aircraft the rotors employed in the present invention are of extremely high-speed type which affords greater lifting power, maneuverability and forward speeds.

With continued reference to the drawings, as illustrated in Figs. 1 and 2 the aircraft of the present invention comprises a fuselage 10 which may have the usual compartments for pilots and passengers as well as windows 11, fuel compartments 12, and a freight compartment 13.

Located in the upper area of the fuselage 10 are a pair of oppositely operating rotors having curved blades 14 and 15 with air scoops 16 and 17 for drawing air into the rotor. The curved blades 14 and 15 have a central opening 19 for the passage of the air therethrough.

A circumferential shroud 15A extends around approximately one-half of the rotor formed of blades 15 being open at the top and bottom and shielding the blades 15 in their forward movement so as to avoid any retarding action. Such shroud 15A is supported by suitable braces 15B extending to and secured to the fuselage. A circumferential rim 15C overlies a small portion of the upper outer extremities of the blades 15 for increasing the rigidity thereof. A shroud 14A extends around substantially one-half of the rotor formed of blades 14 and is supported by braces 14B connected to the shroud 15A and a brace 14C extending around the operative side of the rotor formed of blades 15 and secured to the fuselage 10, thereby securely supporting such shroud, rims 14D being provided around the outer periphery of the blades 14. Radially extending braces 18 connected to the shroud 14A additionally support the shroud 14A in proper operative relation.

A series of relatively flat radial webs 20 are disposed axially of the rotors, six of which are shown in Fig. 1. A reinforcing ring 21 serves to join the outer portions of such web members. The inner edges of the scoops 16 abut the ring 21.

Axially of the rotor members is a shaft 22 to which the ring 21 and the web members 20 are attached by means of a web 23, and retained thereon by a hub 24. At the opposite or lower end of the shaft 22 is a thrust bearing 25 which prevents movement of said shaft in the opposite direction. The shaft is also provided with a collar 26 which supports the same against a thrust bearing 27 adjacent the lower part of the rotor blades 14.

The second rotor comprises blades 15 which are mounted on a drum or hub 28 having a series of openings. The second rotor is rotatably mounted in bearings 29 carried by the fuselage. The upper end of the drum 28 has a series of radial supports 30 providing openings for the passage of air therebetween. The lower end of the drum 28 is provided with similar radial supports 31 which join a hub portion 32 through which bolts or other fastening elements secure the same to a bevel gear 33 freely rotatable about the shaft 22. The blades of the rotor rotate along with the cylinder 28 and the bevel gear 33 all rotate oppositely in unison. Opposite the bevel gear 33 is a second bevel gear 34 fixed to the shaft 22 and rotatable therewith. The bevel gears 33 and 34 are driven from a gear 35 mounted on a power shaft 36 so that the rotors having the blades 14 will rotate in the opposite direction from that of the rotor having the blades 15. The drum or casing 28 is provided with openings 37 to permit air to flow through the same when drawn in by the blades 15. The aircraft is also provided with conventional and directional gear 70 illustrated somewhat diagrammatically in Fig. 2.

In the present invention there are provided a pair of compression units, each consisting of a plurality of pump or compression members. The first series of these compression members is on the shaft 22 and includes disc members 38 having vanes or blades 39 between the same as illustrated in Figs. 2 and 3 and incorporated within a sleeve 40, said sleeve being rotatable with the upper rotor comprising the blades 14 and with the shaft 22. The second compression unit is mounted upon the power shaft 36 and includes similar discs 38 and blades 39. The fuselage is provided with a compression duct having a portion 41 of large diameter and a portion 42 of smaller diameter, the drum 28 and the first compression unit being located in the portion 41 of larger diameter, and the second compression unit being located in the portion 42 of smaller diameter.

From the compression duct compressed air is introduced to a drum type turbo-jet engine 43 having turbine blades 44 within a drum 45, and as shown in Figs. 2 and 4, having external combustion chambers 46 with injection slots 47 through which expanded ignited gases are discharged over the length and breadth of the blades 44. A portion of the air from the compression duct will flow through the opening defined by the inner periphery of the turbo blades 44, and an additional portion of the air will flow through air ducts 48, and such air will be brought together after it passes the drum turbo blades by means of a reduced venturi-like portion 49. This will further add to the turbulence of the air and due to the curvature of the surface will cause the blast to travel in a path similar to the surface of the jai alai bat, and exhausted gases will drive or produce rotation of a propeller 50, mounted on the shaft 36, along with the blades 14 and 15 as well as the compression units. On the rear end of the shaft 36 is mounted a propeller 51, such propeller being provided with a central heat resistant portion 52. The drum turbo-jet engine employs firing or spark plugs 53. This craft as a whole, from lifting saucer propellers to tail, must be considered as one engine, a drum-turbo-jet.

Instead of the vane arrangement as shown in Fig. 4 which provides a continuous firing arrangement, the vanes may include a series of blocks 54 shown in Fig. 5 which seal the slot 47 for a short period of time enabling the gases in the combustion chamber 46 to build up to a higher degree of intensity. Thus, when one of the blocks 54 passes the slot 47 a greater pressure of gas will be exerted against the vanes 44.

A different arrangement of the combustion chambers may be had as disclosed in Fig. 6 wherein said chambers are enclosed within the inner diameter of the vanes 44 from slot 47 and in the path of the compressed air from the compression duct 42. This arrangement will cause the firing chambers 46 and the fuel that will be introduced therein to be predetermined, thus forming a faster and more efficient combustion.

In Fig. 8 a slightly modified aircraft is disclosed having a fuselage 54' and opposed rotary members in the upper portion thereof, or a greater number than two if required, such rotary members being identical to those described comprising the blades 14 having scoops 16 abutting the ring 21 and having web portions 20 attached to a hub 23 and having a cap portion 24 therein. This rotor has a circular narrow ribbon-like rim 14D on the extreme ends of blades that contains cam means for varying the effective surface area of the blades.

These rotors are saucer-like as in the embodiment disclosed in Fig. 2, outwardly disposed in side by side relation in substantially the same plane. The axis of each of these is substantially at the side of the fuselage and substantially one half or more of the rotor extends outside of the fuselage and is exposed. On heavy loads, six or more such rotors may be used. Each of the rotors is mounted upon a shaft 22 which extends through and drives a compression unit corresponding to that of Fig. 2 and is provided with a bevel gear 33 on its lower end. The compression duct of the present embodiment consists of a pair of tubes 55 which join the tube 42 at the entrance to the engine 43 and the engine shaft 36 has a gear 35 which drives the rotors.

Between the pair of shafts 22 and the power shaft 36 are mounted a pair of jack shafts 56 having bevel gears 57 and 58 attached thereto.

Instead of the structure shown, a modified construction may be employed for driving aircraft. One example of such modified type of construction is illustrated in Fig. 9 wherein a drum turbine 60 is shown having a series of blades 61 adapted to be driven by compressed gas discharged from a combustion chamber 62 and through an elongated nozzle (not shown) against the blades 61 of the turbine. The drum turbo-jet is provided with a reduction gearing 64 by means of which a propeller shaft 65 and propeller 51 are driven. The expanding of the gases gives an additional forward thrust to the craft or load, as the charge travels past the hub of propeller. The illustration is of a complete drum turbo-jet engine with the compression unit not shown. The combustion chamber 62 has been illustrated and described as elongated but it still has a comparable area as it passes over or extends beyond the drum turbine.

In the modification of the invention shown in Figs. 1 and 2, it will be observed that a shroud 15A extends over approximately half the circumference of the rotor formed by blades 15 and such shroud serves to deflect the air through which the aircraft is passing so that such air does not impinge upon the forwardly moving blades 15 and consequently the blades do not have a retarding effect on the aircraft. A similar shroud 14A cooperates with the rotor formed by blades 14 and deflects the air away from the blades 14 when such blades are moving forwardly. As a result of this arrangement, the motion of the rotors has principally an action to move the aircraft forwardly and also to maintain the aircraft in flight.

In the modification of Fig. 8 the rotors are shrouded by recesses 68 formed in the fuselage. The shrouding effect produced by the forwardly moving portions of the rotors being within recesses 68 prevents a retarding effect when the rotor blades move forwardly.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. An aircraft comprising a fuselage, a first bladed rotor rotatively mounted on said fuselage for rotation about a vertical axis, said rotor producing a propelling and lifting action, said rotor rotating so that one side of the rotor moves rearwardly relative to the fuselage and the other side moves forwardly, a shroud encompassing a large portion of the other side of said rotor shielding the blades of said other side of the rotor from the air currents passing rearwardly along the fuselage, a second bladed rotor mounted on said fuselage for rotation about the same vertical axis as said first rotor and rotating in a direction opposite to the rotation of said first rotor so that one side thereof moves rearwardly relative to the fuselage and the other side moves forwardly, a second shroud encompassing a large portion of the other side of said second rotor shielding the blades of said other side of said second rotor from air currents passing rearwardly along the fuselage, a motor in said fuselage, means for supplying fuel and air to said motor, and drive means inter-connecting said motor and said rotors producing a propelling force thereon.

2. An aircraft comprising a fuselage, a first bladed rotor rotatably mounted on said fuselage for rotation about a vertical axis adjacent the fuselage, said rotor producing a propelling and lifting action, said rotor rotating so that one side of the rotor moves rearwardly relative to the fuselage so that the other side moves forward, a shroud encompassing a large portion of the other side of said rotor shielding the blades of the other side of the rotor from the air currents passing rearwardly along the fuselage, said rotor having free passage space beneath a major portion thereof for the passage of air downwardly for maintaining the elevation of the aircraft, a second bladed rotor mounted on said fuselage and rotating in a direction opposite to the rotation of said first rotor so that one side thereof moves rearwardly relative to the fuselage and the other side moves forwardly, a second shroud encompassing a large portion of the other side of said second rotor shielding the blades of said other side of said second rotor from air currents passing rearwardly along said fuselage, said second rotor having free passage space beneath a major portion thereof for the passage of air downwardly for maintaining the elevation of the aircraft, a motor on said fuselage, means for supplying fuel to said motor and drive means interconnecting said motor and said rotors producing a propelling force thereon.

References Cited in the file of this patent

UNITED STATES PATENTS

| Number | Name | Date |
|---|---|---|
| 820,238 | Moss | May 8, 1906 |
| 1,039,160 | Mattson | Sept. 24, 1912 |
| 1,059,802 | Williams | Apr. 22, 1913 |
| 1,170,777 | Neal | Feb. 8, 1916 |
| 1,252,369 | Wondra | Jan. 1, 1918 |
| 1,454,283 | Hollander | May 8, 1923 |
| 1,573,563 | Moore | Feb. 16, 1926 |
| 1,584,346 | Ardin | May 11, 1926 |
| 1,654,119 | Enders | Dec. 27, 1927 |
| 1,682,630 | Sargent | Aug. 28, 1928 |
| 1,846,125 | La Fon | Feb. 23, 1932 |
| 1,876,682 | Janney | Sept. 13, 1932 |
| 2,041,789 | Stalker | May 26, 1936 |
| 2,327,145 | Van Gieson | Aug. 17, 1943 |
| 2,401,365 | Mercier | June 4, 1946 |
| 2,443,808 | Stalker | June 22, 1948 |
| 2,488,783 | Stalker | Nov. 22, 1949 |
| 2,518,697 | Lee | Aug. 15, 1950 |
| 2,547,266 | Hoglin | Apr. 3, 1951 |
| 2,610,005 | Price | Sept. 9, 1952 |

FOREIGN PATENTS

| Number | Country | Date |
|---|---|---|
| 267,757 | Italy | Sept. 18, 1929 |